Aug. 15, 1933.  L. M. HILE  1,922,809
BASKET HANDLE
Filed Feb. 13, 1931   2 Sheets-Sheet 1
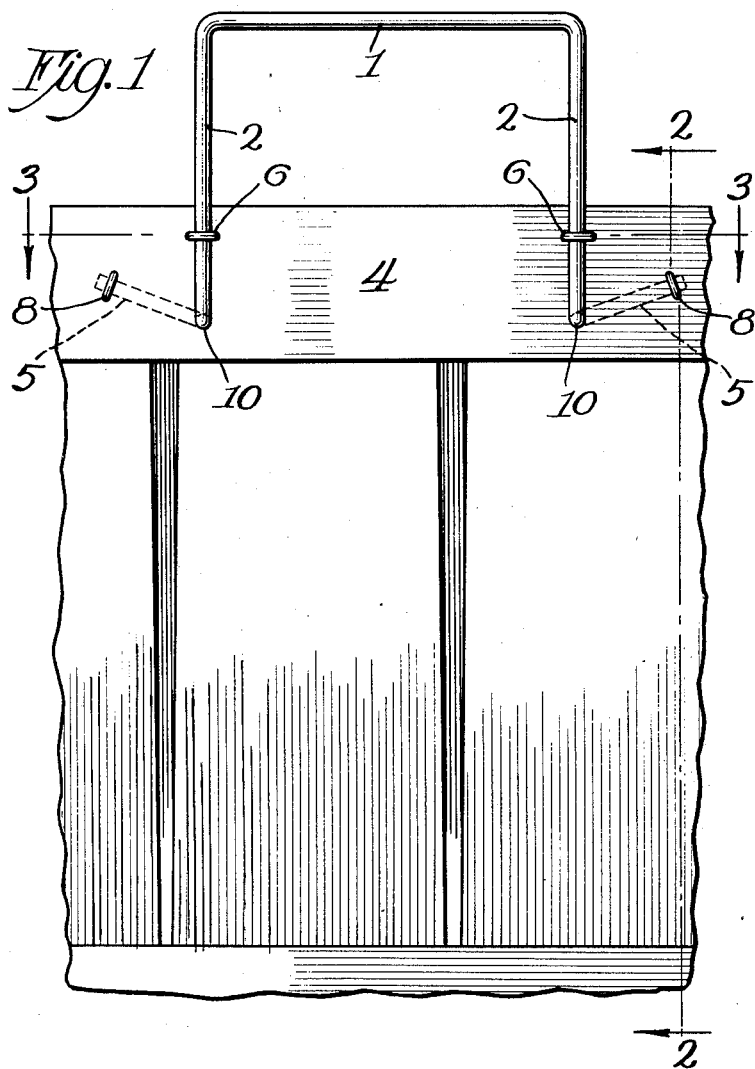
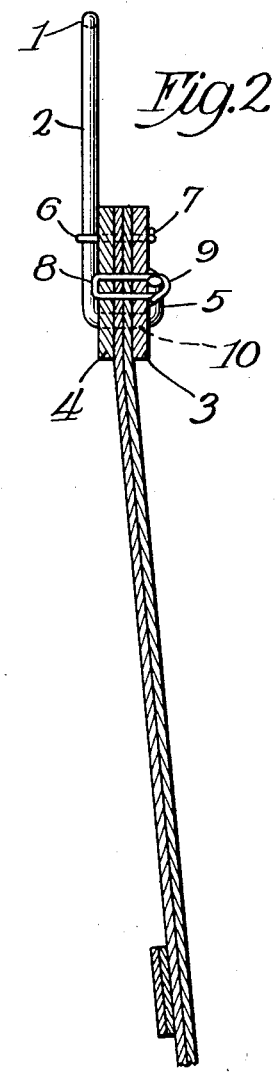
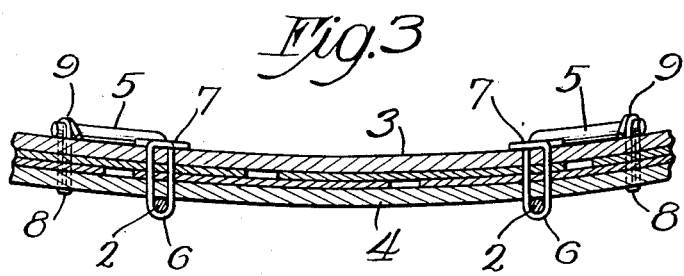
Inventor
L. M. Hile
By Arthur F. Durand Atty.

Aug. 15, 1933.    L. M. HILE    1,922,809
BASKET HANDLE
Filed Feb. 13, 1931    2 Sheets-Sheet 2
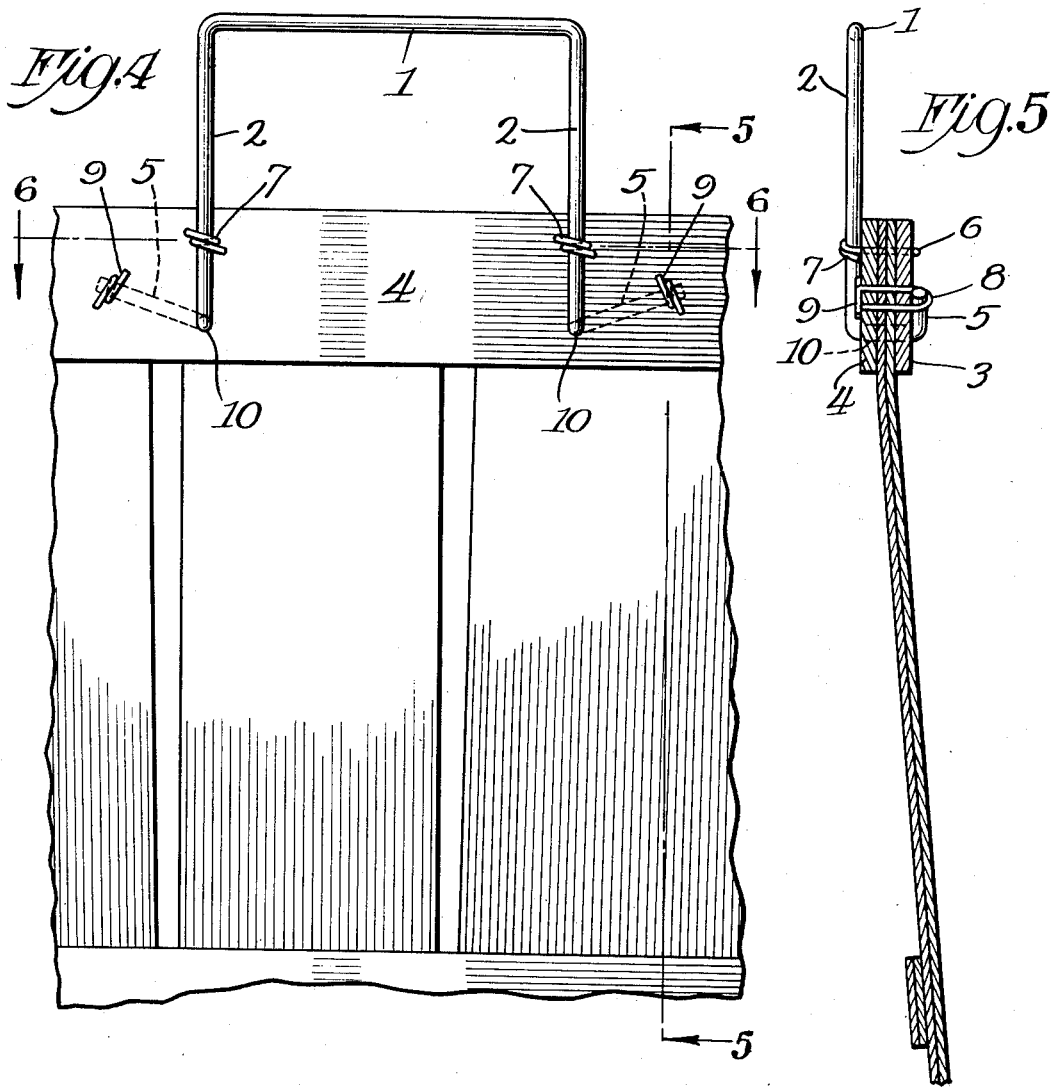
Inventor
L. M. Hile
By Arthur F. Durand
Atty.

Patented Aug. 15, 1933

1,922,809

UNITED STATES PATENT OFFICE 1,922,809

BASKET HANDLE

Leslie M. Hile, Benton Harbor, Mich.

Application February 13, 1931. Serial No. 515,531

4 Claims. (Cl. 217—125)

This invention relates to basket handles, or handles for other receptacles, of the kind comprising a length of wire bent into bail shape and having its two lower end portions suitably attached to the rim of the basket or other receptacle.

Generally stated, the object of the invention is to provide an improved construction and novel arrangement whereby a handle of this kind is effectively fastened in place by means of staples that straddle portions of the handle, such staples being inserted through the rim of the basket or other receptacle and there being a plurality of staples for each end portion of the bail shaped handle.

It is also an object to provide certain details and features of construction and combinations tending to increase the general efficiency and the desirability of a basket handle of this particular character.

To the foregoing and other useful ends, the invention consists in matters hereinafter set forth and claimed and shown in the accompanying drawings, in which—

Fig. 1 is a side elevation of a basket handle embodying the principles of the invention, showing the adjacent portions of the basket or other receptacle to which the handle is attached;

Fig. 2 is a vertical section on line 2—2 in Fig. 1 of the drawings;

Fig. 3 is a horizontal section on line 3—3 in Fig. 1 of the drawings.

Fig. 4 is a view similar to Fig. 1, showing a somewhat different form of the invention.

Fig. 5 is a vertical section on line 5—5 in Fig. 4 of the drawings.

Fig. 6 is a horizontal section on line 6—6 in Fig. 4 of the drawings.

As thus illustrated, the invention comprises a wire handle having a horizontal top portion 1 and vertically disposed side portions 2, these side portions being formed with the end portions, which are inserted through the inner and outer hoops 3 and 4 of the basket or other receptacle, and which are then bent angularly to provide inner portions 5, as shown. In this way, the handle is bail shaped in general form, and is provided with hook shaped depending side portions that are hooked through the rim of the basket or other receptacle in the manner shown and described.

To firmly attach the handles in place, additionally, staples 6 are inserted in position to straddle the portions 2 of the handle, through the rim of the basket or other receptacle, and the inner end portions 7 of the staple are then bent and clinched on the inner hoop 3, as shown. Thus there is a group of staples for each end portion of the handle, and each staple of each group engages only a single portion of the handle. Staples 8 are driven inwardly and have their points or ends 9 clinched and hooked over and around the portions 5 of the handle.

In this way, it will be seen, the operation of forming and inserting the handle itself is performed from the outside of the basket or receptacle, so that the wire ends of the handle are inserted inwardly through the rim of the basket or receptacle, and the retaining staples 6 and 8 are inserted from the outside, inwardly, through the rim of the basket or receptacle.

With the foregoing construction and arrangement, the handle is firmly anchored in the receptacle, and is not liable to be forced or bent away from the outer side of the receptacle, such distortion of the handle being resisted not only by the stiffness of the handle wire itself, but also by the said staples 6 which tightly grip both the outer portions of the hook shaped portions of the handle. Preferably, as shown, the staples 6 are disposed a substantial distance below the upper edge of the rim of the basket or receptacle, but near enough to this edge to provide a substantial length of handle wire from the bottom 10 of each hook to the staple 6 above, thus reducing the leverage when outward pressure is brought against the handle, tending to pull out the staples. But with the construction shown and described, which is illustrative of the invention, the handles are not thus liable to become distorted, and are so firmly anchored that they are not liable to pull out, for the staples 6 form strong links between the inner and outer sides of the rim. In addition, the staples 8, whereby there are a plurality of staples for each end portion of the handle, firmly anchor these portions 5 against displacement.

In Figs. 4, 5 and 6 the construction is quite similar to that previously described, and is as follows:

As thus illustrated, the invention comprises a wire handle having a horizontal top portion 1 and vertically disposed side portions 2, these side portions being formed with end portions which are inserted through the inner and outer hoops 3 and 4 of the basket or other receptacle, and which are then bent angularly to provide inner portions 5, as shown. In this way, the handle is bail shaped in general form, and is provided with hook shaped depending side portions that are hooked through the rim of the basket or other receptacle in the manner shown and described.

To firmly attach the handles in place, additionally, staples 6 are inserted outwardly in position to straddle the portions 5 of the handle, through the rim of the basket or other receptacle, and the outer end portions 7 of the staple are then bent and clinched on the outer portions 2, as shown. Staples 8 are driven outwardly and over the portions 5 of the handle, and have their points 9 clinched on the outer side of the hoop 4, as shown.

In this way, it will be seen, the operation of forming and inserting the handle itself is performed from the outside of the basket or receptacle, so that the wire ends of the handle are inserted inwardly through the rim of the basket or receptacle, and the retaining staples 6 and 8 are inserted from the inside, out, through the rim of the basket or receptacle.

What I claim as my invention is:

1. A basket handle constructed on the rim of a basket, comprising a bail-shaped wire handle having the legs thereof inserted inwardly through the inner and outer hoops of the basket, with the inner ends of the wire bent laterally and upwardly against the inner hoop, and staples inserted through the two hoops, two of said staples engaging upright side portions of the handle, and two other staples engaging the end portions of the wire handle, whereby said bent end portions are maintained at fixed angles to the upright sides of the handle, against the inner hoop.

2. A structure as specified in claim 1, said end portions of the handle being bent away from each other.

3. A structure as specified in claim 1, said staples being inserted inwardly through the two hoops, with the first-mentioned two staples straddling the upright sides of the handle, and the second-mentioned two staples having their ends or points clinched on the end portions of the wire handle.

4. A basket handle constructed on the rim of a basket, comprising a bail-shaped wire handle having the legs thereof inserted inwardly through the inner and outer hoops of the basket rim, with the inner end portions of the wire bent laterally and upwardly against the inner hoop, away from each other, and staples inserted outwardly through the two hoops, two of said staples having their outer ends or points clinched over the side portions of the handle, and two other staples having their heads in engagement with the bent inner portions of the handle, with their outer ends or points clinched on the outer surface of the outside hoop.

LESLIE M. HILE.